Patented Mar. 9, 1926.

1,576,181

UNITED STATES PATENT OFFICE.

GEORG DUBSKY, OF LOBOSITZ, CZECHOSLOVAKIA.

METHOD OF MANUFACTURING LINOLEUM.

No Drawing. Application filed July 14, 1925. Serial No. 43,614.

*To all whom it may concern:*

Be it known that I, GEORG DUBSKY, a citizen of the Czechoslovakian Republic, residing at Lobositz, Czechoslovakia, have invented a certain new and useful Method of Manufacturing Linoleum, for which I have filed an application in Czechoslovakia, June 16, 1924, of which the following is a specification.

As is well known, the manufacture of linoleum comprises several separate operations, some of which take a great deal of time. First of all the linseed oil or the linseed oil varnish is oxidized to linoxyn, which alone takes 1 to 2 months if carried out according to the Walton process. Linoleum cement is then manufactured from the linoxyn and the linoleum is finally made from the cement by mixing it with the filling substances, which requires a very complicated system of apparatus. Although by using Taylor's method of oxidizing the linseed oil the linoxyn can be produced much more quickly, the subsequent treatment of the Taylor linoxyn to obtain linoleum is just as complicated as the Walton treatment of the linoxyn; moreover the product is not the same as that obtained according to Walton's method, since it contains more polymerization products. In order to simplify the manufacture, it has already been proposed to mix all the raw materials such as linseed oil, resin, cork etc., together, to treat the mass with air in a suitable stirring apparatus and thereby convert the linseed oil into a solid form. (German Patents 100,917 of 21 May, 1897, and 109,583, of 21 April, 1898). However, this method has proved to be unsuitable, as the oil oxidizes too energetically, the mass becomes heated and carbonizes very easily particularly when large quantities are being treated, and even if it is possible to obtain linoleum in this way by working with small quantities the product is not sufficiently elastic. The proposed method was therefore not adopted in the industry, and hitherto linoleum has never been manufactured in any other way than by means of finished linoxyn.

Careful systematic investigations and practical experiments have led to the invention of a new method of producing linoleum which has none of the disadvantages of the older methods. It avoids the direct complete oxidation of the linseed oil in the presence of the other raw materials, as well as the production of linoxyn in the form of an intermediate product. The new method consists in first thickening the linseed oil, for instance by treating it with injected air until it is gelatinous, but still liquid in heat, and thereupon mixing it with the other raw materials and treating the mass again with air at an increased temperature, until it has reached the desired consistency. In contradistinction to linoxyn, the thickened linseed oil—like all other drying oils which have been subjected to a similar preliminary treatment—, can be very easily mixed with the other constituents of the linoleum in order to form an absolutely uniform mass; moreover, in spite of the presence of these constituents, it does not react violently with the oxygen in the air and ignite, but reacts gently, so that the process can be very easily regulated. At the same time this subsequent oxidation takes place relatively quickly as a result of the substance having been saturated with oxygen to a more or less large extent in the first phase. The resulting products are of perfect quality and are particularly elastic.

*Example.*

Crude linseed oil is mixed with resinic acid lead, corresponding to 0.5% lead oxide calculated with respect to the quantity of oil, and is treated with air in the stirring apparatus until it just gelatinizes. 6 kgs. of resin are added to 33 kgs. in the stirring apparatus, and the mixture is heated to 120° C.; 29 kgs. ocher and 40 kgs. cork are then added to the melt and the mixing is continued with a supply of air, until the mass can be easily rolled on the calender.

What I claim is:—

The method of manufacturing linoleum comprising partially oxidizing a drying oil by heating and injecting air into the same until it gelatinizes, adding filling material to the same, injecting air into said mixture at an elevated temperature while continually agitating the same to gently and rapidly complete the oxidation of the linseed oil.

In testimony whereof I have signed my name to this specification.

GEORG DUBSKY.